(12) United States Patent
Zhao et al.

(10) Patent No.: US 8,077,200 B2
(45) Date of Patent: Dec. 13, 2011

(54) IMAGE CAPTURE SYSTEM AND METHOD OF CAPTURING LABELED IMAGE

(75) Inventors: Lian Zhao, Zhejiang Province (CN); Wenyong Dong, Zhejiang Province (CN)

(73) Assignee: Asia Optical Co., Inc., Tepz, Taichung (TW)

( * ) Notice: Subject to any disclaimer, the term of this patent is extended or adjusted under 35 U.S.C. 154(b) by 571 days.

(21) Appl. No.: 12/355,842

(22) Filed: Jan. 19, 2009

(65) Prior Publication Data

US 2009/0195678 A1 Aug. 6, 2009

(30) Foreign Application Priority Data

Feb. 5, 2008 (TW) .............................. 97104650 A

(51) Int. Cl.
*H04N 7/18* (2006.01)

(52) U.S. Cl. ........ 348/136; 348/137; 348/140; 348/360; 396/107; 396/109

(58) Field of Classification Search ........... 348/136–137
See application file for complete search history.

(56) References Cited

U.S. PATENT DOCUMENTS

| | | | | |
|---|---|---|---|---|
| 4,710,011 A * | 12/1987 | Ushiro | ........................... | 396/106 |
| 4,914,460 A * | 4/1990 | Caimi et al. | ..................... | 396/28 |
| 5,028,949 A * | 7/1991 | Kawano | ........................ | 396/106 |
| 5,677,760 A * | 10/1997 | Mikami et al. | ................ | 356/3.04 |
| 5,701,015 A * | 12/1997 | Lungershausen et al. | . | 250/495.1 |
| 5,982,423 A * | 11/1999 | Sekiguchi | ................... | 348/216.1 |
| 6,009,189 A * | 12/1999 | Schaack | ........................ | 382/154 |
| 6,252,659 B1 * | 6/2001 | Norita et al. | .................... | 356/625 |
| 7,224,396 B2 * | 5/2007 | Oochi et al. | ................... | 348/345 |
| 7,365,771 B2 * | 4/2008 | Kahn et al. | ............... | 348/207.99 |
| 7,541,588 B2 * | 6/2009 | Tabirian et al. | ............. | 250/341.1 |
| 7,800,643 B2 * | 9/2010 | Hama | ........................... | 348/135 |
| 7,990,415 B2 * | 8/2011 | Matsumoto et al. | .......... | 348/136 |
| 2009/0195678 A1* | 8/2009 | Zhao et al. | ..................... | 348/273 |

* cited by examiner

*Primary Examiner* — Clayton E Laballe
*Assistant Examiner* — Bret Adams
(74) *Attorney, Agent, or Firm* — Thomas|Kayden

(57) ABSTRACT

An image capture system is provided. The image capture system for capturing an image of an object includes a light emitting module, a lens, a base unit and a filter unit. The light emitting module provides a plurality of light beams to form a reference area. The base unit includes a light sensor corresponding to the lens. The filter unit includes at least one visible light passing portion and at least one invisible light passing portion. The filter unit is driven to position one of the visible light passing portion and the invisible light passing portion between the lens and the light sensor. The actual size of the object can be estimated via the reference area.

20 Claims, 7 Drawing Sheets

IMAGE CAPTURE SYSTEM AND METHOD OF CAPTURING LABELED IMAGE

CROSS REFERENCE TO RELATED APPLICATIONS

This Application claims priority of Taiwan Patent Application No. 097104650, filed on Feb. 5, 2008, the entirety of which is incorporated by reference herein.

BACKGROUND OF THE INVENTION

1. Field of the Invention

The invention relates to an image capture system, and in particular, to an image capture system which can generate a label mark and a method of capturing a labeled image.

2. Description of the Related Art

When capturing an image with a camera, the object being captured is measured by placing a scale (for example: a pen, a coin or a ruler) adjacent thereto for reference, such that the scale and the object can be compared in order to get a better understanding about the size of the object.

However, if the object being captured is a column, a beam or strips on a wall for a construction site, and the size of the object is also desired, it is difficult for a photographer to capture an image by using a scale, such as a pen, a coin or a ruler, adjacent thereto for reference, as it may not be easy to get close to the object.

Therefore, if a camera can provide a scale for reference around an object or near an object, the above problems concerning difficulties in getting close to an object or using a scale adjacent thereto for reference, can be mitigated. Thus, improving convenience of image capture devices.

BRIEF SUMMARY OF THE INVENTION

The invention provides an image capture system having the ability to provide a scale for reference.

The invention also provides a method for capturing a labeled image.

Accordingly, the image capture system captures an image of an object. The image capture system comprises a light emitting module, a lens, a base unit, a switch mechanism and an image processing unit.

The light emitting module projects a plurality of infrared light beams. The infrared light beams form a reference area. The lens, having an optical axis, receives the infrared light beams reflected from the object and visible light beam emitted by the object. The base unit comprises a light sensor corresponding to the optical axis of the lens, transforming incident optical signals into an image signal.

The switch mechanism comprises a filter unit and a switch driver. The filter unit comprises at least one visible light passing portion and at least one invisible light passing portion. The switch driver drives the filter unit to position one of the visible light passing portion and the invisible light passing portion between the lens and the light sensor. The image processing unit integrates the image signal from the light sensor.

The method of capturing a labeled image comprises the following steps: The light emitting module projects a plurality of infrared light beams, and the infrared light beams form a reference area. The visible light passing portion is placed between the light sensor and the lens, and the light sensor captures light beams passing through the visible light passing portion. The invisible light passing portion is placed between the light sensor and the lens, and the light sensor captures light beams passing through the invisible light passing portion. An image processing unit integrates image signals captured by the light sensor.

The invention is advantageous in that the emission of the infrared light beam of the light emitting module provides a reference area adjacent to an object as a scale to help estimate the size of the object.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

In the following detailed description of the preferred embodiments, reference is made to the accompanying drawings which show by way of illustration, four specific embodiments in which the invention may be practiced.

Figure 1:
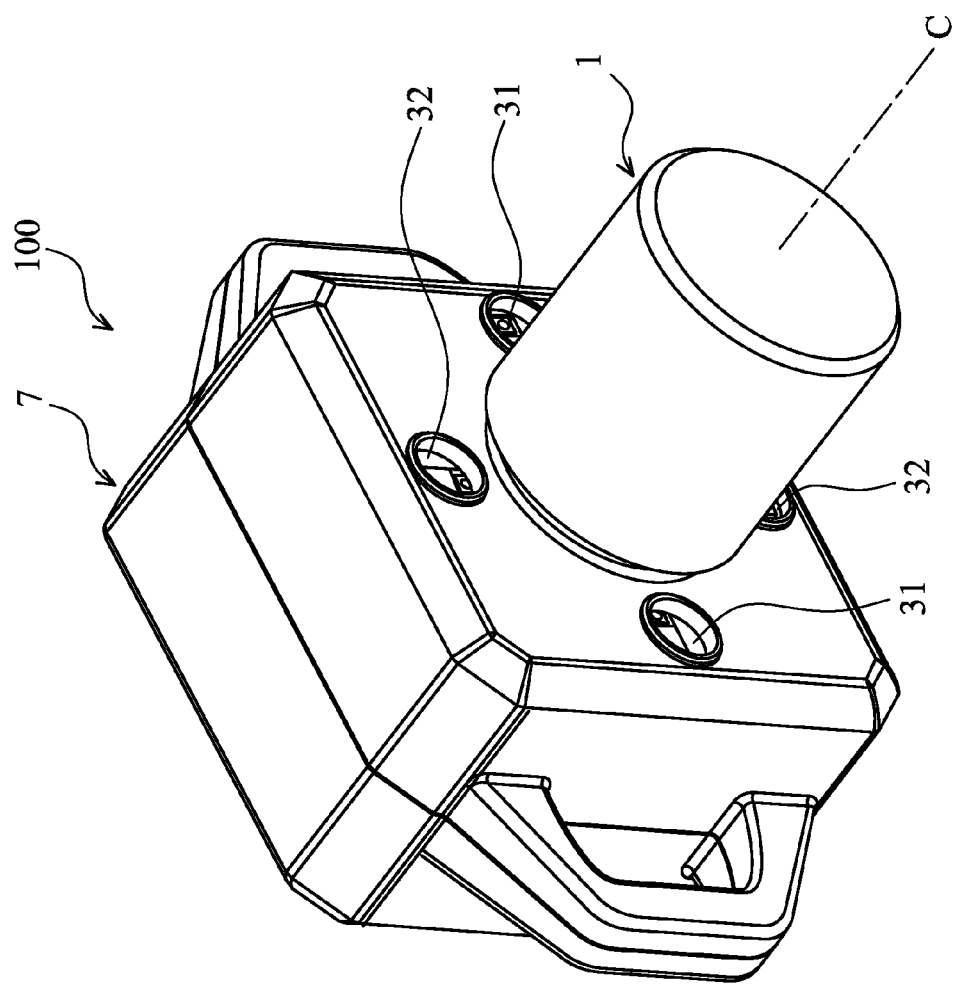
FIG. 1 is a schematic view of an embodiment of an image capture system of the invention applied in a camera.
Figure 2:
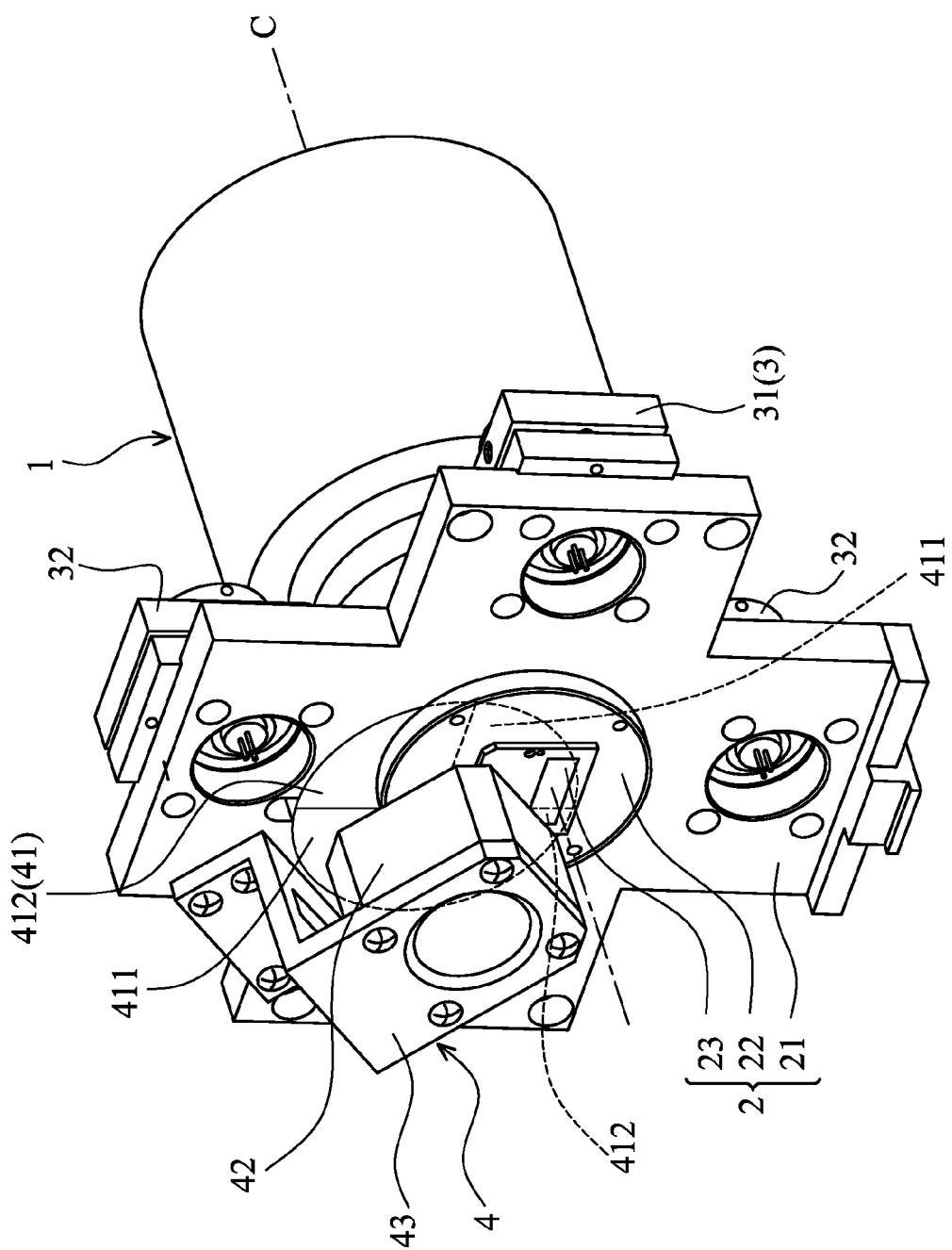
FIG. 2 is an assembled view of the embodiment of the invention.
Figure 3:
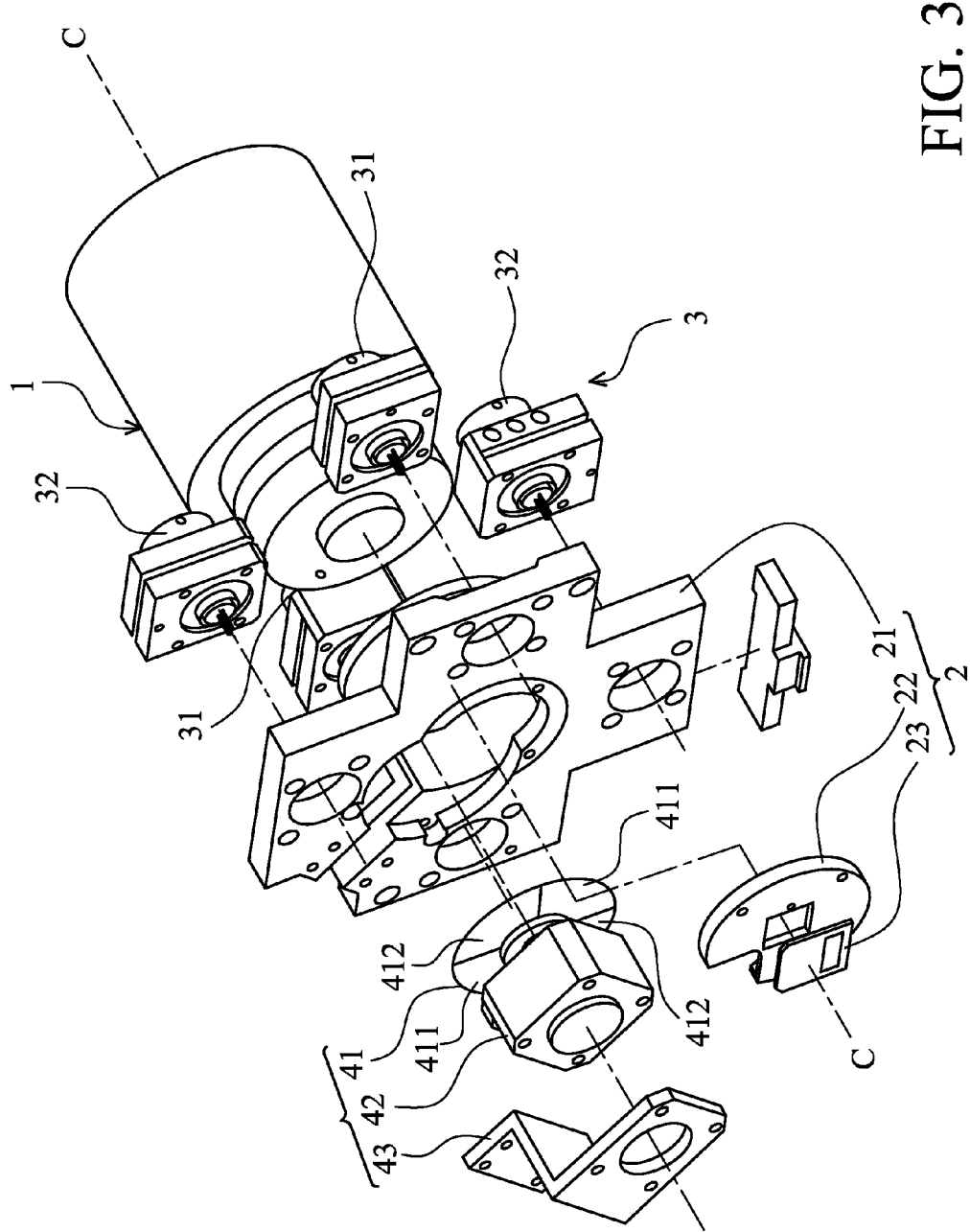
FIG. 3 is an exploded view of the embodiment of the invention.
Figure 4:
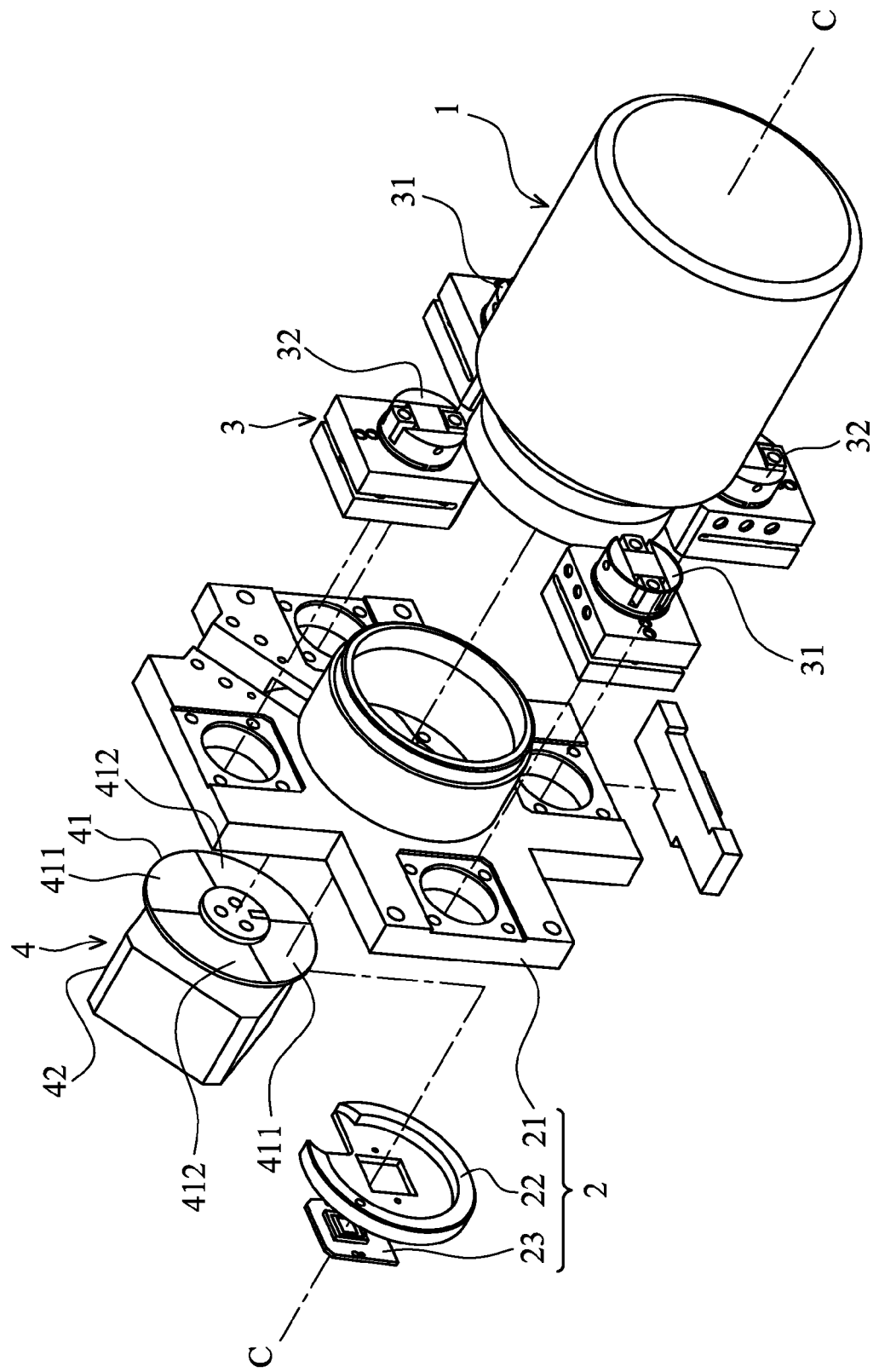
FIG. 4 is another exploded view of the embodiment of the invention.
Figure 5:
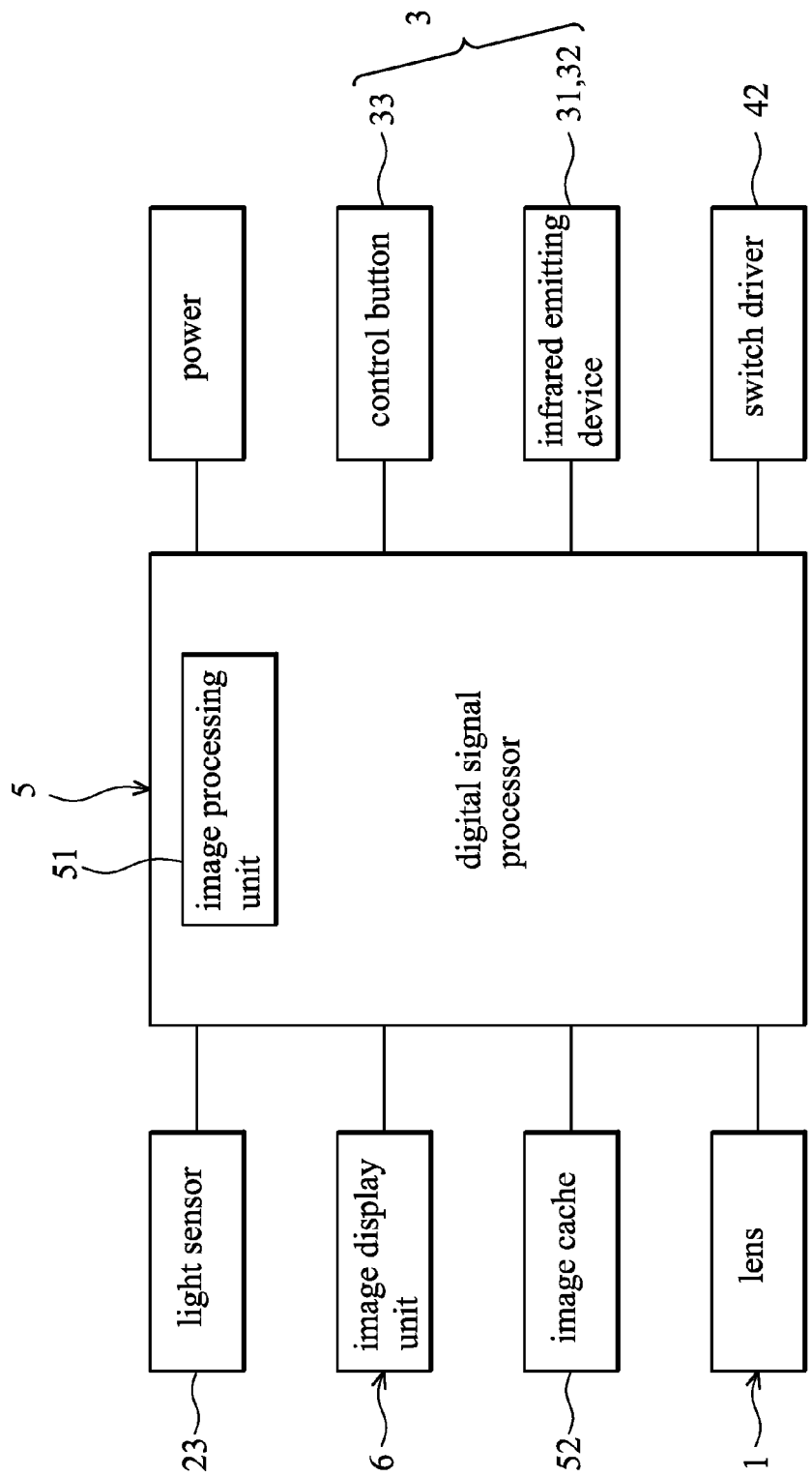
FIG. 5 is a diagram showing formation of the image capture system.
Figure 6:
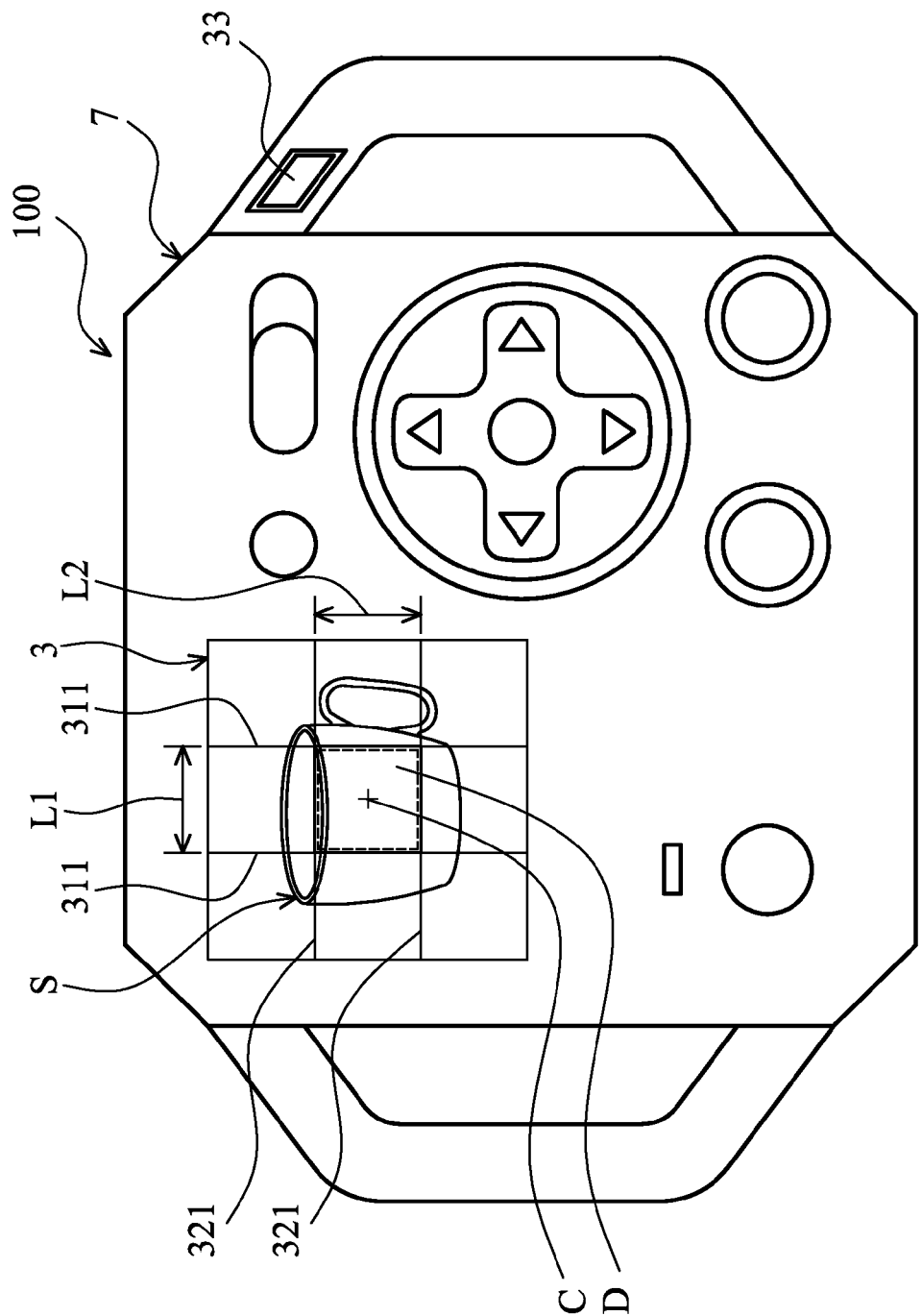
FIG. 6 is a schematic view showing reflected first infrared light beams, second infrared light beams and visible light beam emitted by an object displayed on an image display unit.

Referring to FIGS. 1, 3 and 5, a preferred embodiment of an image capture system of the invention is shown. In the embodiment, the image capture system is a camera 100 for capturing an object S (as shown in FIG. 6) for being shot. The image capture device 100 comprises a lens 1, a base unit 2, a light emitting module 3, a switch mechanism 4, a digital signal processor 5, an image display unit 6 and a housing 7. The housing 7 is eliminated in FIGS. 2, 3 and 4 for clarity. In the embodiment, the image display unit 6 is a liquid crystal display (LCD).

The lens 1, having an optical axis C, is assembled on the base unit 2. The base unit 2 comprises a main body 21 for assembling the lens 1 and a light sensor 23 corresponding to the optical axis C, which is assembled on the main body 21 by a bottom portion 22. The light sensor 23 captures optical signals from the lens 1, and transforms the incident optical signals into image signals. In the embodiment, the light sensor 23 is a charge-coupled device (CCD), a complementary metal oxide semiconductor (CMOS) or other solid state elements having the ability to transform the optical signal into the image signal.

As shown in FIGS. 2, 4 and 6, the light emitting module 3 projects a plurality of light beams. In the embodiment, the light beams refer to infrared light beams, but it is not limited thereto. The infrared light beams emitted by the light emitting module 3 form a reference area D on a plane. In detail, the light emitting module 3 comprises two first emitting devices 31, two second emitting devices 32 and a control button 33 used to control the first and second emitting devices 31, 32. The two first emitting devices 31 are assembled on the main body 21 of the base unit 2, respectively located on the left and right sides of the lens 1. The two second emitting devices 32 are also assembled on the main body 21 of the base unit 2, respectively located on upper and bottom sides of the lens 1.

The two first emitting devices 31 project two first infrared light beams 311, and straight line beams in parallel to each other, forming a first length L1 therebetween as a scale for reference. The two second emitting devices 32 project two second infrared light beams 321, and straight line beams in parallel to each other, forming a second length L2 therebetween as a scale for reference. The reference area D comprises the first length L1 and the second length L2. When the control button 33 is pressed, the first and second emitting devices 31, 32 project the first and second infrared light beams 311, 321, respectively. The first and second infrared light beams 311, 321 emitted to the object S, and are reflected to the lens 1. The lens 1 receives the reflected first and second infrared light beams 311, 321 and the visible light beam from the object S.

In the embodiment, the first, second infrared light beams 311, 321 are line beams projected in a direction that is parallel with the optical axis C, and form a double-lined crisscross (#) after traveling a determined distance. For example, the first length L1 and the second length L2 are both 8 cm, which means the reference area D (as shown in dotted line of FIG. 6) formed in the center of the double-lined crisscross is a square with 8 cm-long sides. However, the present invention is not limited thereto.

The switch mechanism 4 comprises a filter unit 41, a switch driver 42 and a rack 43. The filter unit 41 is a disk-shaped color wheel comprising two visible light passing portions 411 and two invisible light passing portions 412, alternately disposed with equal angles (90 degree).

The switch driver 42, assembled to the main body 21 by the rack 43, drives the filter unit 41 to rotate, positioning one of the visible light passing portions 411 and the invisible light passing portions 412 between the lens 1 and the light sensor 23.

Accordingly, a complex optical signal enters the image capture device 100 via the lens 1. The visible light passing portion 411 or the invisible light passing portion 412 is switched to be positioned between the lens 1 and the light sensor 23, allowing the visible light passing portion 411 to absorb or eliminate the invisible infrared light beams or stray light beams, or allowing the invisible light passing portion 412 to absorb or eliminate the visible light beam, such that the light sensor 23 can capture the image of the object S, or detect the infrared light beams reflected from the exterior. In the embodiment, the visible light passing portions 411 or the invisible light passing portions 412 are made of an optical coating or an optical member, but it is not limited thereto.

Referring to FIG. 5, the digital signal processor (DSP), controlling the operation of the components within the image capture device 100, comprises an image processing unit 51. The image processing unit 51 processes an image signal from the light sensor 23, stores the image signal in an image cache 52, and integrates the visible light beam and the infrared light beams into an image shown in the image display unit 6. Thus, a user can estimate the actual size of the object S with the naked eye by comparing it with the reference area D.

Figure 7:
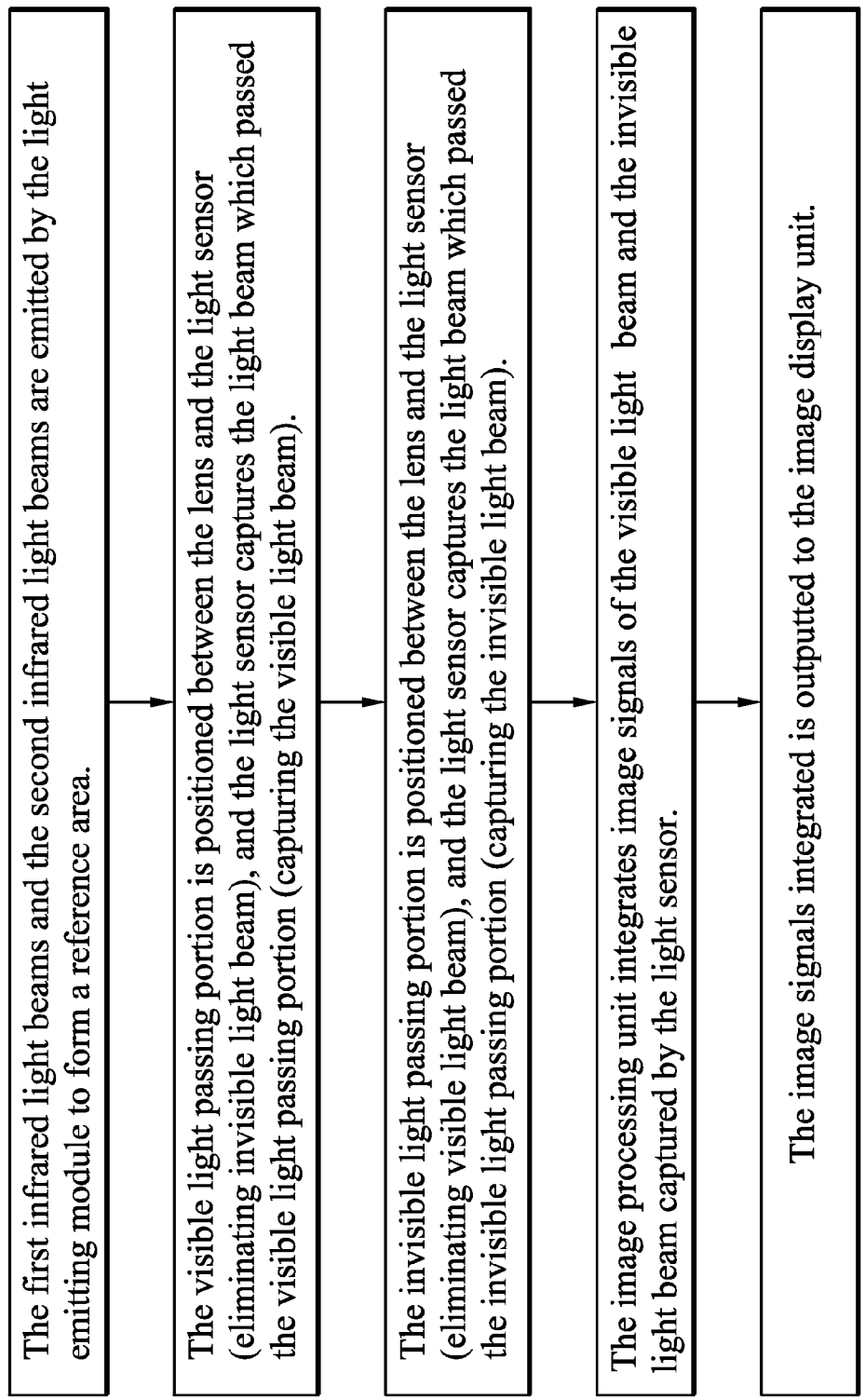
FIG. 7 is a flow chart showing a method for capturing a labeled image by the image capture system of the invention.

As shown in FIGS. 4, 6 and 7, a method for capturing a labeled image according to an embodiment of the invention by using the above described image capture device 100 comprises the following steps:

Step one: The object S is focused with the lens 1 of the image capture device 100. The control button 33 of the light emitting module 3 is pressed, activating the first and second emitting devices 31, 32 to emit the first and second infrared light beams 311, 321. The first and second infrared light beams 311, 321 form a double-lined crisscross (#) after traveling a determined distance in order to frame a reference area D. The first length D1 of the reference area D is formed between the first infrared light beams 311, and the second length D2 of the reference area D is formed between the second infrared light beams 321.

Step two: The switch driver 42 of the switch mechanism 4 drives the filter unit 41 to rotate, aligning one of the visible light passing portions 411 on the optical axis C, between the light sensor 23 and the lens 1. Meanwhile, the visible light beam of the object S and the first and second reflected infrared light beams form a complex optical signal which enters the lens 1. However, only the visible light beam passes the visible light passing portion 411, and the reflected infrared light beams are absorbed or eliminated by the visible light passing portion 411. Next, the light sensor 23 captures the visible light beam passing through the visible light passing portion 411 and transforms the visible light beam into a first image signal which in stored in an image cache 52.

Step three: The switch driver 42 of the switch mechanism 4 drives the filter unit 41 to rotate ninety degrees, aligning one of the invisible light passing portions 412 on the optical axis C, between the light sensor 23 and the lens 1. Meanwhile, only the infrared light beams pass the invisible light passing portion 412, and the visible light beam is absorbed or eliminated by the invisible light passing portion 412. Next, the light sensor 23 captures the infrared light beams passing through the invisible light passing portion 412 and transforms the infrared light beams into a second image signal which is stored in an image cache 52.

Step four: The image processing unit 51 processes the first and second image signals stored in the image cache 52 and integrates them into an image.

Step five: Referring to FIG. 6, the image signals resulting from the above steps are outputted to the image display unit 6. Because the first and second image signals have already been integrated into the image, the object S and the labeled image, formed by the first and second infrared light beams 311, 321, is presented in the image simultaneously. Therefore, a user can estimate the actual size of the object S with the naked eye by comparing the object S with the reference area D.

It should be noted that after the light sensor 23 captures the infrared light beams which are invisible, the second image signal generates a gray-level label via digital conversion and signal processing. In detail, in the embodiment, the double-lined crisscross (#) is first generated in gray level, and is then configured with a specific color on the first image signal to form the image via setting of the image capture device 100 or via the user preference.

In the above steps, the infrared light beams are eliminated (in step two), and the visible light beam is captured (in step three) before the visible light beam is eliminated (in step four) and the infrared light beams are captured (in step five). However, one skilled in the art can also eliminate the visible light beam and capture the infrared light beams before eliminating the infrared light beams and capturing the visible light beam, and the invention is not limited thereto.

The advantageous of the present invention are described as follows.

By utilizing the light emitting module 3, the first and second infrared light beams 311, 321 are emitted to form a reference area D near the object S, replacing the conventional method, wherein a scale is positioned beside the object S as reference. Thus, difficulties in getting close to an object S or using a scale adjacent thereto for reference are mitigated. Additionally, convenience of an image capture device is improved.

Note that the present invention comprises the following embodiments.

First, in the embodiment of the invention, the filter unit 41 is a disc shaped color filter, and the switch driver 42 is a motor or a step motor driving the filter unit 41 to rotate. However, the filter unit 41 can also be a rectangular structure comprising a visible light passing portion 411 and a invisible light passing unit 412, and the switch driver 42 can also be a magnetic valve to switch the filter unit 41 on the optical axis C, between the lens 1 and the light sensor 23, such that the switch mechanism 4 fulfills the same function as the filter switch.

Second, in the embodiment of the invention, the spot beams emitted by laser sources within the first and second emitting devices 31, 32 are changed into line beams by the cylindrical mirrors (not shown) to form the first and second infrared light beams 311, 321. However, if the cylindrical mirror is not present, the first and second infrared light beams 311, 321 can be emitted to be spot beams (not shown). Meanwhile, the distance between the two spots of the first infrared light beam 311 is the first length L1, and the distance between the two spots of the second infrared light beam 321 is the second length L2, wherein the function to provide a scale for reference can be fulfilled.

Third, in the embodiment of the invention, the light emitting module 3 utilizes the two first emitting devices 31, and the two second emitting devices 32 to emit the first and second infrared light beams 311, 321. However, it is also possible to comprises only two emitting devices or three emitting devices aligned in an L shape (not shown) for emitting two or three line beams or spot beams, wherein the function to provide a scale for reference can be fulfilled.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capture system comprising:
   a light emitting module providing a plurality of light beams to form a reference area;
   a lens;
   a base unit comprising a light sensor, the light sensor transforming a complex optical signal projected into the lens to a plurality of image signals, wherein the complex light signal comprises the light beams reflected by an object;
   a switch mechanism comprising a filter unit and a switch driver, wherein the filter unit comprises at least one visible light passing portion and at least one invisible light passing portion, and the switch drive drives the filter unit to position one of the visible light passing portion and the invisible light passing portion between the lens and the light sensor; and
   an image processing unit integrating the image signals from the light sensing unit.

2. The image capture system as claimed in claim 1, further comprising an image display unit displaying an image integrated by the image processing unit.

3. The image capture system as claimed in claim 2, wherein the filter unit is disc shaped and comprises two visible light passing portions and two invisible light passing portions, wherein the visible light passing portions and the invisible light passing portions are disposed alternately with equal distance therebetween, and the switch driver is a motor rotating the filter unit, positioning one of the visible light passing portion and the invisible light passing portion between the lens and the light sensor.

4. The image capture system as claimed in claim 1, wherein the light emitting module emits two vertical first beams and two horizontal second beams.

5. The image capture system as claimed in claim 4, wherein the reference area comprises a first length and a second length, the first length is a distance between the two vertical first beams, and the second length is a distance between the two horizontal second beams.

6. The image capture system as claimed in claim 4, wherein the light emitting module comprises two first emitting devices and two second emitting devices, wherein each of the first emitting devices emits one of the first beams, and the two first beams are parallel with each other, and each of the second emitting devices emits one of the second beams, and the two second beams are parallel with each other.

7. The image capture system as claimed in claim 6, wherein the light emitting module and the lens are assembled to the base unit.

8. An image capture system, comprising:
   a light emitting module providing at least one light beam;
   a lens receiving a complex optical signal reflected by an object;
   a filter unit filtering the complex optical signal from the lens and outputting a first transmitted light and a second transmitted light;
   a light sensor detecting the first transmitted light and the second transmitted light in sequence and providing two image signals; and
   an image processing unit integrating the image signals provided by the light sensor.

9. The image capture system as claimed in claim 8, wherein the filter unit comprises at least one first filtering portion and a second filtering portion, and the filter unit is controlled by a switch mechanism to output the first transmitted light and the second transmitted light.

10. The image capture system as claimed in claim 9, wherein the first filtering portion reflects or absorbs invisible light.

11. The image capture system as claimed in claim 9, wherein the second filtering portion allows the light beam reflected by the object to pass therethrough.

12. The image capture system as claimed in claim 9, wherein the filter unit further comprises a color filter, and the first filtering portion and the second filtering portion are disposed on the color filter.

13. The image capture system as claimed in claim 8, wherein the light emitting module comprises four emitting devices emitting two vertical line beams and two line beams.

14. The light emitting system as claimed in claim 13, wherein each of the emitting devices comprises a laser source and a cylindrical mirror, and a spot beam emitted by the laser source is changed into the line beams via the cylindrical mirror.

15. A method for capturing a labeled image, comprising
   (A) projecting at least one light beam on an object;
   (B) providing a filter unit adjacent to a light sensor, wherein the filter unit is switched to transform a complex optical signal, inputted to the filter unit, into a first transmitted light and a second transmitted light, and the first transmitted light and the second transmitted light is output in sequence, wherein the complex optical signal comprises the light beam reflected by the object;

(C) receiving the first transmitted light and the second transmitted light and outputting two corresponding image signals by the light sensor; and (D) integrating the image signals and outputting an image.

16. The method of capturing a labeled image as claimed in claim 15, wherein the filter unit comprises at least one first filtering portion and at least one second filtering portion.

17. The method of capturing a labeled image as claimed in claim 16, wherein the first filtering portion reflects or absorbs invisible light and outputs the first transmitted light, and the second filtering portion allows the light beam reflected by the object to pass therethrough and outputs the second transmitted light.

18. The method of capturing a labeled image as claimed in claim 16, wherein the filter unit further comprises a color filter, and the first filtering portion and the second filtering portion are disposed on the color filter.

19. The method of capturing a labeled image as claimed in claim 15, wherein the laser source emits four spot beams, and the four spot beams are changed into four line beams via cylindrical mirrors corresponding thereto.

20. The method of capturing a labeled image as claimed in claim 19, wherein the line beams comprises two vertical line beams and two horizontal line beams.

* * * * *